July 29, 1958 F. E. SMITH ET AL 2,845,168
VIBRATORY CONVEYOR

Filed Nov. 26, 1954 2 Sheets-Sheet 1

INVENTORS
FLOYD E. SMITH
CHARLES L. LOVERCHECK

July 29, 1958  F. E. SMITH ET AL  2,845,168
VIBRATORY CONVEYOR

Filed Nov. 26, 1954  2 Sheets-Sheet 2

Inventors
FLOYD E. SMITH
CHARLES L. LOVERCHECK

United States Patent Office 2,845,168
Patented July 29, 1958

2,845,168

VIBRATORY CONVEYOR

Floyd E. Smith and Charles L. Lovercheck, Erie, Pa.

Application November 26, 1954, Serial No. 471,192

5 Claims. (Cl. 198—220)

This invention relates to part feeders and conveyors and more particularly to part feeders wherein articles of manufacture are to be aligned or dressed to be fed into another manufacturing process for packaging or for a subsequent manufacturing process.

Prior vibratory part feeders and conveyors of the character disclosed herein have usually been supported on springs and the springs tuned to their natural frequency and the entire feeder operated by means of an electric solenoid actuated by electrical impulses of the frequency equal to the tuned frequency of the springs. This type of support for vibratory part feeders has introduced various difficulties and disadvantages in that it is difficult to tune a spring to an exact frequency which is convenient to use.

It is, accordingly, an object of this invention to provide a part feeder which will overcome the above and other defects in prior part feeders and, more particularly, it is an object of this invention to provide a part feeder which is simple in construction, economical to manufacture, and simple and efficient to use.

Another object of this invention is to eliminate the use of metal springs in a parts feeder and, more particularly, to substitute air pressure for a spring in a parts feeder.

Another object of the invention is to provide a part feeder wherein a particular shaped pole face on a solenoid is used to actuate a part feeder in connection with spring pressure.

A further object of this invention is to provide a part feeder wherein juxtaposed solenoids having particular pole face shapes and having like poles adjacent each other actuate a part feeder device.

Another object of the invention is to provide a part feeder wherein juxtaposed solenoids having particular pole face shapes and having like poles adjacent each other actuate a part feeder device through a controlled path.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
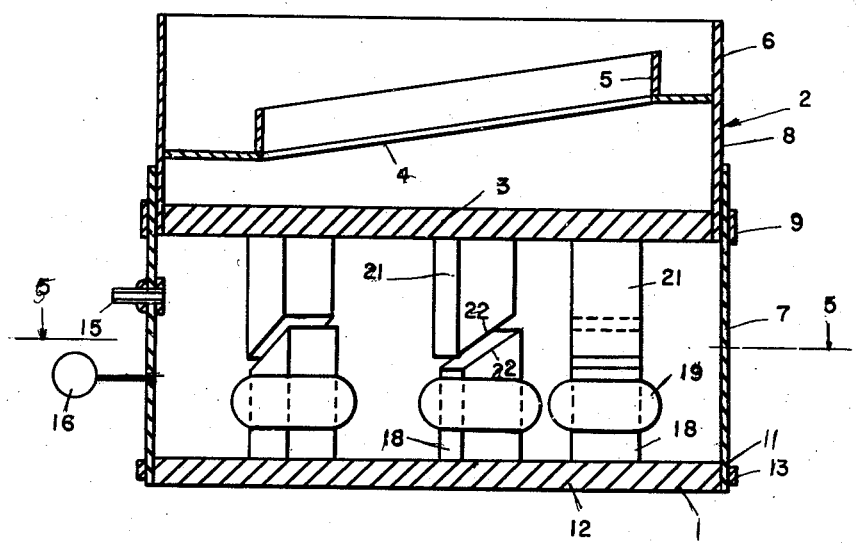
Fig. 1 is a longitudinal cross sectional view of a parts feeder according to the invention.
Figure 5:
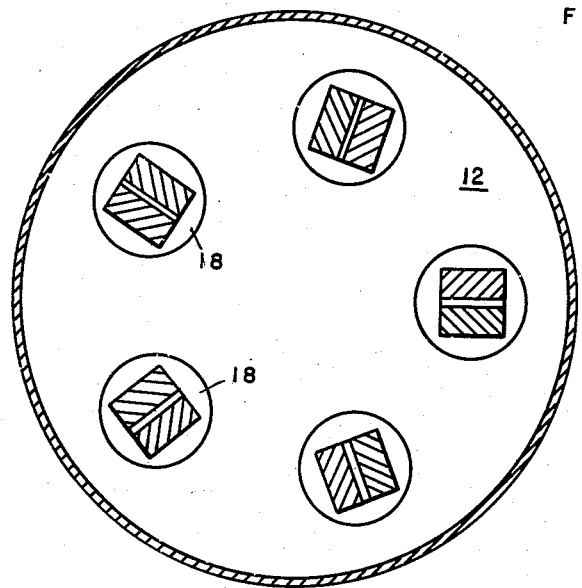
Fig. 5 is a cross sectional view taken on line 5—5 of Fig. 1.

Now with more specific reference to the drawings, Fig. 1 shows a parts feeder having a base 1 and a hopper 2 supported on the base 1. The hopper 2 is made up of the bottom portion 3 having a helical track 4 therein with an inner wall 5 on the track 4. The hopper 2 is generally cylindrical and has side walls 6. The hopper 2 is of the character of hoppers now in general use, for example, the hopper shown in British Patent 279,119 of 1927, and has attached to the base 1 thereof a drum 7 of resilient flexible material which is wrapped around the lower portion 8 of the hopper 2 and is held in sealed relation thereto by means of the hoop 9.

The lower end 11 of the drum 7 is sealingly secured to the base 12 by means of the hoop 13 which is wrapped around the lower edge of the member 7 so that the volume between the bottom 3 of the hopper 2 and the base 12 enclosed by drum 7 forms a gas tight container into which gas is injected through the valve 15 to maintain a constant pressure therein as indicated by the gauge 16. The pressure can be regulated to any optimum value by means of pumping air into the valve 15 or releasing air to obtain the optimum operating pressure within the container.

The hopper 2 is actuated by means of the solenoids 18 which are disposed around the circumference of the base 12 and which have the coils 19 wound thereon which are adapted to magnetize the solenoids 18 intermittently through an intermittent current of the desired frequency. The upper cores 21 are secured to the bottom 3 of the hopper 2 and have slanting pole faces 22 which are adapted to be urged to the spaced relation position shown in the drawings with a clearance therebetween.

During operation, parts to be dressed are disposed in the hopper 2 and an intermittent electric current is applied to the coils 19 of the solenoids 18 which may be connected either in series or in parallel, depending upon the specific design. The intermittent current will be applied on the frequency of the desired vibration of the hopper 2. The pressure will urge the container to its uppermost position. The gas pressure in the container will be adjusted as indicated on the gauge 16 to the optimum value to obtain the desired frequency. This will, in some cases, be equal to the total force exerted by the solenoids 18 divided by the area of the hopper bottom 3.

When the current is applied to the solenoids 18, the hopper 2 will be pulled downward and rotated. This will reduce the stress in the resilient flexible member 7 and will reduce the compressive force in the gas in the container. Then when the current is intermittently stopped, the gas pressure will force the hopper 2 upward and the resilient drum 7 will put it back to its natural position. The downward force on the next application of the current will cause the solenoids 18 to exert a force downward and in a rotative direction which will again pull the hopper 2 down and turn it, pulling it out from under the parts which will accordingly be advanced upward according to a principle well known to those skilled in the art.

Figure 2:
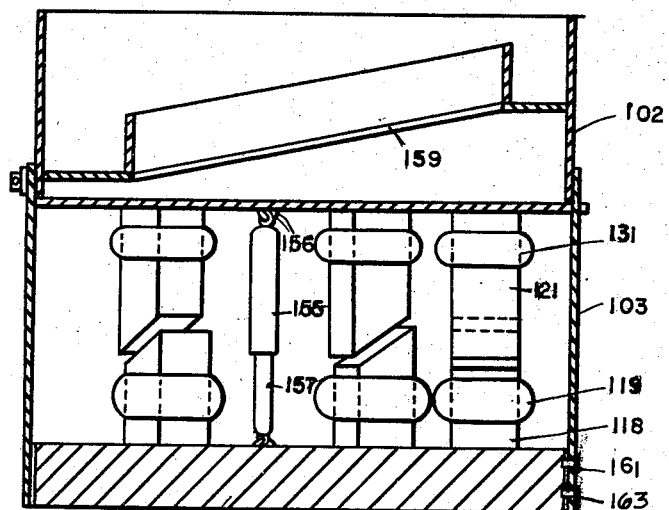
Fig. 2 is a similar view of another embodiment of the invention.
Figure 7:
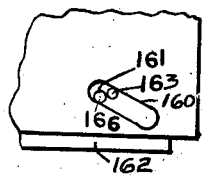
Fig. 7 is an enlarged view of the base guiding member shown in Fig. 2.

In the embodiment of the invention shown in Fig. 2, a hopper 102 is shown similar to the hopper 2 shown in Fig. 1; a support member 103 which is made of rigid material is also shown. Solenoids 118 are similar to solenoids 18 shown in Fig. 1; however, in the case of the device shown in Fig. 2, coils 131 are wound on the cores 121 attached to the hopper 120 as well as around the cores of the solenoids 118 attached to the base and the connection is such that when an alternating current is applied to all the coils 119 of the solenoids 118 and the coils 131 are excited with D. C. current, current will be applied to the coils 119 which will permit the coils 119 to have like poles to force the hopper 102 upward and alternately unlike poles to force the hopper 102 downward. The coils 131 are supplied with a current through the rectifier tube 141 and the capacitance 141 and reactance 142 which act as filtering elements. The D. C. current is applied to the magnetic poles and keeps them all magnetized in the same polarity constantly. The solenoids 118 are actuated by means of A. C. current by wires 150 and 151 which excite the coils 119 to alternately reverse the polarity of the poles.

A resilient member, for example, a spring or resilient block of rubber, is attached to the hopper 102 at 156 and to the base 157. This tends to check the motion of the hopper 102 at the end of its stroke and to store energy to help return it to its position and to prevent an impact at the end of each movement.

The support 103 has angularly disposed slots 160 disposed at spaced intervals around the outside thereof and the spindles 161 are rigidly attached to the base 162 and have roller bearings 163 thereon. As the hopper 102 is oscillated upward and downward by the coils 131, a torsional and axial direction is imparted to the hopper 102 since the support 103 is restrained to move the edges of the slots 160 along the bearings 163 and 166.

The parts to be sorted are disposed in the hopper 102 and power is turned on to wires 150 and 151. The D. C. current applied to the upper coils 131 will magnetize them with a constant polarity and the A. C. current applied to the wires 150 will magnetize the lower solenoids 118 and a downward and rotative force will be exerted on the hopper 102 by the sliding pole pieces which will cause the upper and lower poles to attract and repel alternately at a speed determined by the frequency of the A. C. line current. The dash pot 155 will cushion the oscillation of the hopper 102 and cause it to operate smoothly. The parts which move over the track 159 will be sorted by a proper sorting mechanism designed for the specific purpose.

Figure 3:
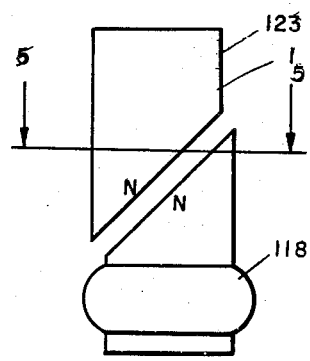
Fig. 3 is an enlarged view of one of the solenoids used in the embodiment of the invention shown in Fig. 1 utilizing a permanent magnet.
Figure 6:
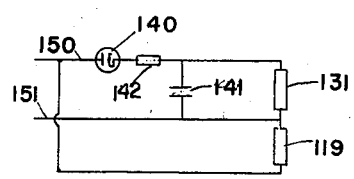
Fig. 6 is a view of a wiring diagram used with the embodiment of the invention shown in Fig. 2.
Figure 4:
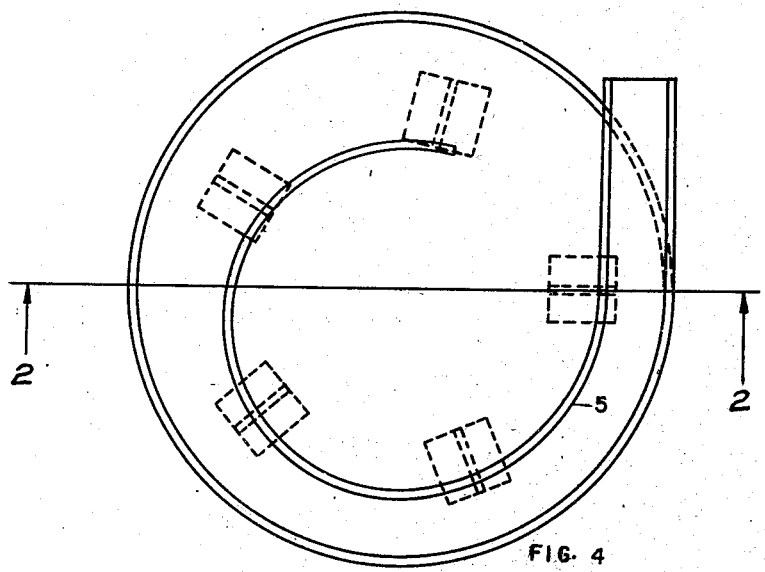
Fig. 4 is a top view of the parts feeder.

Fig. 3 shows a permanent magnet 123 used instead of solenoid 131 shown in Fig. 2. The permanent magnet 123 is made of high strength magnetic material, for example, the material sold under the registered trademark "Alnico 5," and operates much like the solenoid 131.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A parts feeder comprising a hopper having a helical shaped track therein, a base, means to support said hopper on said base, said means comprising a container having flexible walls, a solenoid attached to the base with a core attached to said hopper in spaced relation to said solenoid, the pole face of said solenoid being disposed at an acute angle to the plane of said base and the pole face of said core being parallel to the pole face of the solenoid, and means to excite said solenoid to attract said core toward said solenoid imparting a torsional and an axial force to said hopper, said container being filled with gas under pressure and said hopper being attached to said base by means of said flexible member, said gas pressure adapted to urge said hopper upward and said flexible member adapted to urge said hopper to bring said pole faces into spaced relation to said solenoid pole faces.

2. A parts feeder comprising a base and a hopper, a resilient drum attaching said hopper to said base and forming a gas tight container with said base and said hopper, said container having walls made of flexible sheet material, a helical track extending around said hopper, and solenoids attached to said base having pole faces slanting tangentially and extending radially of said base, cores attached to said hopper having pole faces parallel to said solenoid pole faces and being offset from said base supported solenoids, said solenoids being adapted to be excited alternately whereby said hopper is pulled down alternately and forced upward alternately by said gas pressure.

3. A vibratory conveying device comprising a member having a track to convey articles, means to support said conveying device on a base, said means comprising a container having flexible side walls and containing gas under pressure in engagement with said conveying device, and means to oscillate said member, said gas pressure urging said member upward, said oscillating means exerting an axial and a rotatiye force on said conveyor.

4. A parts feeder comprising a base having resilient means thereon supporting a parts feeder hopper, said resilient means comprising a flexible side member made of sheet like material extending upwardly and forming a gas tight enclosure with said base and said hopper, said enclosure being filled with gas under pressure, said gas urging said hopper upward, and means to intermittently apply a downward and torsional force to said hopper.

5. The feeder recited in claim 4 wherein said means to apply force comprises spaced solenoid means attached to said hopper and said base intermittently urging said hopper in a helical path.

References Cited in the file of this patent

UNITED STATES PATENTS

| | | |
|---|---|---|
| 778,021 | Feingold | Dec. 20, 1904 |
| 2,535,050 | Devol | Dec. 26, 1950 |
| 2,630,210 | Carrier et al. | Mar. 3, 1953 |
| 2,662,192 | Weyandt | Dec. 8, 1953 |